(12) United States Patent
Richard et al.

(10) Patent No.: US 9,272,353 B2
(45) Date of Patent: Mar. 1, 2016

(54) DEVICE FOR CENTERING AND CLAMPING TUBULAR PARTS, COMPRISING MEANS FOR REGULATING THE GAS FLOW RATE IN ORDER TO CONTROL THE OXYGEN CONTENT

(75) Inventors: Gilles Richard, Silly le Long (FR); Eric L'Arvor, Villers-Cotterets (FR)

(73) Assignee: SERIMAX, Mitry Mory (FR)

( * ) Notice: Subject to any disclaimer, the term of this patent is extended or adjusted under 35 U.S.C. 154(b) by 1431 days.

(21) Appl. No.: 11/914,997

(22) PCT Filed: May 22, 2006

(86) PCT No.: PCT/FR2006/001158
§ 371 (c)(1),
(2), (4) Date: Apr. 1, 2009

(87) PCT Pub. No.: WO2006/123069
PCT Pub. Date: Nov. 23, 2006

(65) Prior Publication Data
US 2009/0302007 A1 Dec. 10, 2009

(30) Foreign Application Priority Data

May 20, 2005 (FR) .................................... 05 05079

(51) Int. Cl.
*B23K 9/16* (2006.01)
*B23K 9/028* (2006.01)
(Continued)

(52) U.S. Cl.
CPC ................. *B23K 9/0282* (2013.01); *B23K 9/16* (2013.01); *B23K 9/325* (2013.01); *B23K 37/0531* (2013.01); *B23K 2201/10* (2013.01)

(58) Field of Classification Search
CPC .... B23K 9/052; B23K 9/0253; B23K 9/0282; B23K 9/0286
USPC ............ 219/59.1, 61, 74, 161, 607, 629, 643; 228/44.5, 102, 219; 73/49.5, 49.8, 37, 73/46
See application file for complete search history.

(56) References Cited

U.S. PATENT DOCUMENTS 4,385,501 A * 5/1983 Ziegler ........................... 62/129
4,541,055 A 9/1985 Wolfe et al.
(Continued)

FOREIGN PATENT DOCUMENTS

EP 0193812 9/1986
EP 0249079 4/1987
(Continued)

*Primary Examiner* — Brian Jennison
(74) *Attorney, Agent, or Firm* — Oblon, McClelland, Maier & Neustadt, L.L.P

(57) ABSTRACT

The invention relates to a device for centering and clamping conduits which are preferably made from alloy steel and which are positioned end to end in order to be welded to form a pipeline. The invention comprises: means for centering and clamping two conduits that are to be welded, optional leak-tight partition means which define an inerting chamber at the mating surface, and inert gas distribution means for creating a protective atmosphere at the mating surface. The inventive device also comprises at least means for regulating the flow of inert gas and/or the supply pressure of said inert gas as a function of the concentration of $O_2$ measured in the protective atmosphere and/or the pressure measured within said atmosphere, such as to maintain the $O_2$ content of the atmosphere below a pre-determined alarm threshold value and/or the pressure of the atmosphere below a pre-determined threshold value.

17 Claims, 2 Drawing Sheets

Figure 1:
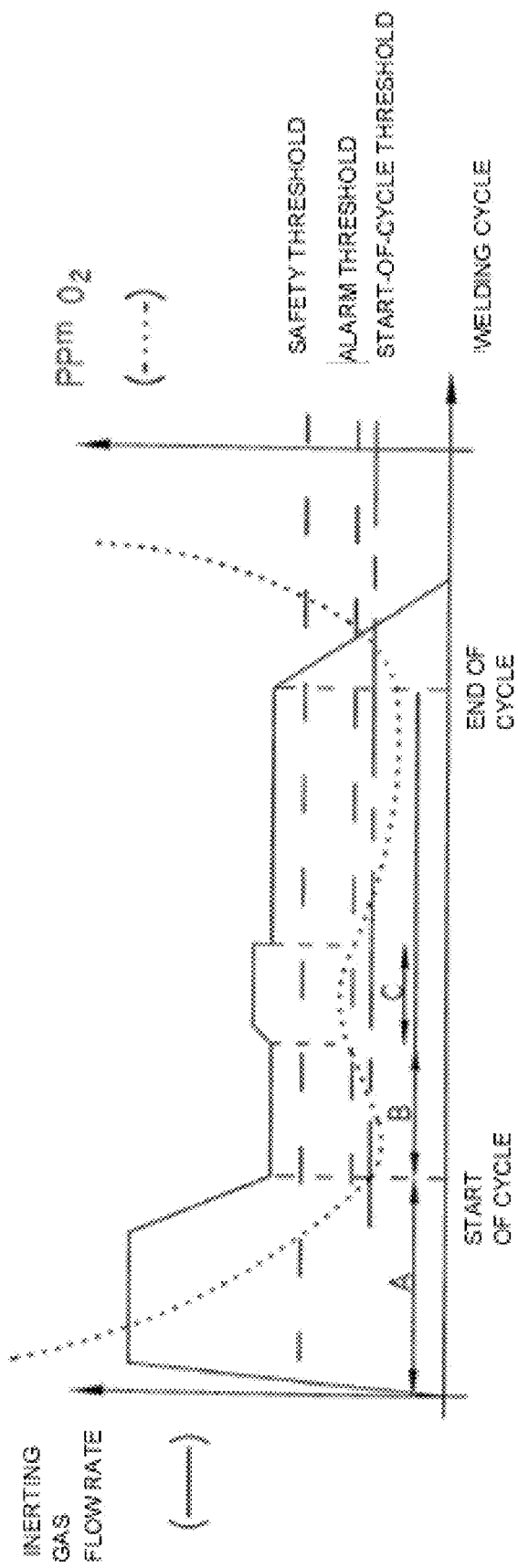

(51) Int. Cl.
*B23K 9/32* (2006.01)
*B23K 37/053* (2006.01)

(56) References Cited

U.S. PATENT DOCUMENTS

| | | | | |
|---|---|---|---|---|
| 4,669,650 | A | * | 6/1987 | Moe .............................. 228/219 |
| 5,425,492 | A | * | 6/1995 | Thode ........................... 228/102 |
| 5,435,479 | A | | 7/1995 | Puzey et al. |
| 5,864,111 | A | * | 1/1999 | Barefoot ......................... 219/61 |
| 2004/0004064 | A1 | * | 1/2004 | Lanouette et al. ....... 219/130.21 |

FOREIGN PATENT DOCUMENTS

| | | |
|---|---|---|
| EP | 0767719 | 4/1997 |
| EP | 1123774 | 8/2001 |
| EP | 1207003 | 5/2002 |
| GB | 2355425 | 4/2001 |
| SU | 1094710 A1 | 5/1984 |
| WO | 96/11765 | 4/1996 |
| WO | WO 03/066265 A2 | 8/2003 |

* cited by examiner

DEVICE FOR CENTERING AND CLAMPING TUBULAR PARTS, COMPRISING MEANS FOR REGULATING THE GAS FLOW RATE IN ORDER TO CONTROL THE OXYGEN CONTENT

The present invention relates to a device for centering and clamping tubular parts such as pipes made of alloy steel, placed end to end in order to be welded to form a corrosion-resistant pipeline for the transport of gas, petroleum or water.

In the construction of a pipeline, the end of one pipe is placed at the extremity of the pipeline under construction in order to weld them together. It is thus possible to construct a pipeline of the desired length by simple addition of pipes. The exterior welding device is generally arranged for relocation along the pipeline so constructed and to make the welds as needed while a device inside the pipeline is likewise relocated inside the latter.

This internal device, when a new pipe to be welded is put in place, makes it possible to align the axis of this pipe perfectly with that of the pipeline under construction and therefore to align the respective extremities of the pipe and the pipeline with precision for the purpose of welding, as well as to keep them in this alignment during the welding operation. A centering and clamping device of this type is commonly called a "clamp" and is described in particular in EP 0,249,079, EP 1,123,774 and EP 0,767,719.

The welding device found positioned on the outside of the stainless steel or alloy steel pipes then deposits the welding layer or layers on the outside. At the time of the first layer, called the penetration layer, it is important that the fusion bath not come into contact with an active, i.e., non-inert gas, such as air or oxygen, so as to prevent oxidation from taking place when they are heated to welding temperatures. As a matter of fact, if welding is performed in an atmosphere containing oxygen, the pipeline produced is then susceptible to much more rapid corrosion. Therefore, so as to protect the fusion bath, the exterior welding device comprises means permitting the production of gaseous protection by bringing in, opposite the weld, inert gas for protecting the said fusion bath.

However, it has been noted that this exterior protection is insufficient. In effect, as the penetration layer is produced, the fusion bath behind the weld comes into contact with an atmosphere not free of oxygen. A device for internal centering and clamping provided with means creating a leak-tight chamber at the surface between the two pipes and purging the oxygen contained in this chamber while introducing an inert gas such as argon to create an inert atmosphere at the weld has therefore been proposed in EP 0,193,812. So as to maintain this protective atmosphere throughout the welding operation, the flow of argon is kept continuous in the leak-tight chamber. Such a device thus makes it possible to produce an atmosphere free of oxygen behind the weld. A device of the same type is likewise disclosed in EP 1,207,003.

Devices provided with means for measuring the oxygen content so as to produce the presence of a protective atmosphere sufficient to allow start of a welding cycle are also known.

Thus, a centering and clamping device in which may be provided a flexible pipe and an associated connection through which is carried an oxygen-purge gas, the gas source comprising valves for regulating the flow of purge gas, has been proposed in document GB 2,355,425. A suitable pick-up for measuring the gas/oxygen ratio is provided on the clamp or on the outside at the orifice for exhaust of the oxygen/gas. This pick-up permits continuous monitoring of the ratio and sends the data to a suitable station and when the value of the ratio is suitable, welding is allowed to commence. Measurement of the gas/oxygen ratio is continuous so as to verify that this ratio has a suitable value throughout welding, it not being proposed to modulate the gas flow rate during the course of welding as a function of this measurement.

Proposed in WO 96/111,765 is a device used for welding end to end of pipes comprising barrier-forming means for closing a part of the interior space of the pipe and means for emission of a protective gas made up of radial nozzles which distribute the gas in laminar or quasi-laminar form at the welding surface. Means for measuring the oxygen content of the gas are provided in the form of a needle, the point of which is situated downstream of the welding surface, so that the gas flowing away at the welding surface will always have an oxygen content below that of the gas sucked in at this point. The measurement made serves only to determine the start of welding.

Proposed in document U.S. Pat. No. 4,541,055 is a device for machining parts by laser and in particular a computer control device for the said machining, in which a machining chamber receives the part to be machined as well as a non-reactive gas, the entry flow rate of which is monitored and kept constant. Checks are made from the measurement of oxygen content and water in the chamber. However, these measurements do not provide regulation of the flow rate or of the pressure of the purge gas, but serve to start or stop welding as a function of the content. Thus, the flow rate of the purge gas is controlled as a function of the welding phase under way and the sampling of oxygen is automatically interrupted during welding.

However, devices of this type have at least two major disadvantages in that:
  very high consumption of inert gas is required, the flow of inert gas being continuous during the entire welding operation to guarantee this protective atmosphere. This consumption not only results in high cost but also requires sufficient reserves of inert gas, which may result in problems of supply and of space required for the device, and
  as the penetration layer is welded, the
  inerting chamber becomes more and more leak-tight, and the continuous flow of inert gas will create a suppression in the said chamber, a suppression which may result in imperfections in the profile of the penetration layer such as for example a concave profile, which may be cause for rejection as a function of the length and depth of the concave profile.

U.S. Pat. No. 5,435,479 also discloses a clamping and centering device of a type which makes it possible to keep together two pipes to be welded during a welding operation performed under inert atmosphere. The inert gas is distributed through a manifold equally at each clamping means, the pressure of the gas being precisely controlled to guarantee the best quality of welding, the pressure having to be kept sufficiently high to avoid contamination by the oxygen of the atmosphere (oxidation of the weld) and sufficiently low to avoid displacement of the melted welding metal. This pressure is measured in the manifold by a pressure pick-up, the flow rate control reads the measurements and consequently regulates the flow rate to maintain a constant pressure in the manifold. However, since the pressure is measured at the manifold, a direct measurement of the pressure in the inert gas at the mating surface is not obtained, so that there is the risk of suppression at the mating surface, since it is the pressure in the manifold that is measured and serves as the reference for regulation of the gas flow rate.

Document U.S. Pat. No. 5,425,492 proposes a purge device by which a purge gas is introduced at a weld to be made in order to exhaust in particular the reactive gases in a defined interior space at the weld. So as to maintain an effective flow of purge gas, the pressure in the interior space is measured and the measured values are sent to a control that incrementally adjusts the discharge of the gas into the interior space. However, the interior space at the mating surface is vast and emission of the purge gas does not occur opposite the mating surface but at the extremities of this interior space, so that the flow of purge gas is laminar and extends along the walls of the interior space up to the weld. Consequently, despite the proposed regulation, the consumption of purge gas remains great in order to maintain an effective protective atmosphere. Moreover, since measurement of the pressure is made at the extremities of the space so defined and in the vicinity of the means of emission of the purge gas, it may also be assumed that it does not reflect the pressure at the mating surface, which cannot result in effective regulation in real time.

To overcome these disadvantages, the present invention proposes a centering and clamping device making it possible to produce a protective atmosphere for the weld inside the pipes to be welded but which also makes it possible to monitor and regulate the said protective atmosphere.

Therefore, the subject of the present invention is a centering and clamping device for pipes, preferably made of alloy steel, placed end to end to be welded and to form a pipeline, comprising in particular means for centering and clamping two pipes to be welded, optionally leak-tight partition means which define an inerting chamber at the mating surface and means for distribution of an inert gas for creating a protective atmosphere at the mating surface, characterized in that it in addition comprises at least means for regulation of the flow of inert gas and/or of the supply pressure of said inert gas as a function of the $O_2$ content measured in the protective atmosphere and/or the pressure measured within the said atmosphere, so as to maintain the $O_2$ content of the atmosphere below a predetermined alarm threshold value and/or the pressure of the said atmosphere below a predetermined alarm threshold value.

Thus, the device advantageously makes it possible to define and maintain optimal welding conditions (an atmosphere free of $O_2$) by regulating the flow rate and/or pressure of the inert gas distributed relative to one or the other of the $O_2$ content of the protective atmosphere and the pressure prevailing in the protective atmosphere in the inerting chamber at the mating surface or by associating the two.

This gaseous protection behind the weld makes it possible to obtain optimal penetration-layer quality, regardless of the welding process used, such as by MIG/MAG fusible electrode arc, refractory electrode arc, etc., by regulating the flow rate of the inert gas (such as argon) and/or the supply pressure of the inert gas, so as to maintain the $O_2$ content and/or the pressure of the protective atmosphere below the predetermined alarm threshold values, so as to guarantee good conditions for welding without however requiring continuous distribution of the inert gas. Thus, the device advantageously is economical while at the same time helping to improve the profile of the penetration layer.

Preferably, an $O_2$-content alarm threshold value of 5000 ppm and a pressure alarm threshold value of 12 millibars are selected.

The device advantageously comprises means for real-time measurement of the $O_2$ content within the protective atmosphere, for example confined to the inside of the inerting chamber, and means for processing, preferably in real time, the measurements of the $O_2$ content, processing of the said information (measurements) making it possible to determine, in real time, the instructions for command of the means for regulating the flow and/or the supply pressure of the inert gas in order to maintain the $O_2$ content below the predetermined alarm threshold, if necessary.

The device may likewise comprise means for real-time measurement of pressure, such as a pressure pick-up, making it possible to measure the pressure within the protective atmosphere or the inerting chamber and means for the processing, preferably in real time, of pressure measurements, processing of the said information (measurements) making it possible to determine, in real time, the instructions for command of the means for regulation of the flow rate and/or the supply pressure of the inert gas, in order to maintain the pressure below the predetermined alarm threshold, if necessary.

The data measured for pressure and/or $O_2$ content are advantageously then recorded and processed in real time so as to regulate the supply pressure and/or the flow rate of inert gas, in real time, in the course of a welding cycle in order to maintain optimal conditions for welding. The data may also be transferred to a command and control unit outside the pipeline under construction by telegraphic, infrared, radio transmission or any other suitable means.

To the predetermined alarm threshold value below which the $O_2$ content and/or the pressure must be, may be added a start-of-cycle threshold value, below the alarm threshold value, so that the welding cycle only commences at an $O_2$ content and/or a pressure below this start-of-cycle threshold value. Similarly, there may be provided a safety threshold value, greater than the alarm threshold value, which, if it is reached, produces the command for means of automatic arrest of welding for the purpose of total arrest of the welding cycle.

Preferably, therefore, when the means for measuring pressure and/or $O_2$ content detect pressure values and/or $O_2$ content values below predetermined alarm threshold values and preferably below start-of-cycle threshold values, means for command of welding on the outside are activated and the welding cycle is started. The welding cycle then proceeds as long as the pressure and/or $O_2$ content values measured remain below the alarm threshold values.

If, during welding, the means for regulating the flow and/or the supply pressure of the inert gas do not permit pressure and/or $O_2$ content values below alarm threshold values to be maintained and if the duration of exceedance of the alarm threshold is below a predetermined interval of time, means may be provided for transmission of an error message to the command and control unit of the outside welding station. If the duration of exceedance of the alarm threshold exceeds the predetermined time, then means for the automatic arrest of welding are activated and the welding cycle can be automatically interrupted.

Instructions to the regulating means may be sent by electrical telegraphic connection, by radio transmission, by infrared or by any other suitable means of transmission.

The processing means preferably comprise at least means for recording the alarm threshold value, the start-of-cycle threshold value and the safety threshold value, as well as means for comparisons of the measurements made with the recorded values. The threshold values may thus be selected by the user and programmed as a function of the environment and the operating conditions.

The leak-tight partition means which define the inerting chamber preferably are composed of seals such as inflatable seals, lip seals or other, or of inflatable rubber rings. This inerting chamber advantageously makes it possible to reduce the volume of inert gas to be diffused in order to obtain the gaseous protection sought, on the one hand, and to reduce the duration in order to reach this predefined content and/or pressure, also called inerting duration, on the other.

Means for measuring the temperature may be provided in the inerting chamber, in particular for measuring the ambient temperature in which the $O_2$ content and pressure pick-ups work, and to verify that this temperature is compatible with the range of use of these pick-ups.

According to a preferred form of the device according to the invention, the inert gas distribution means are located on the device in such a way that this distribution takes place directly behind the mating surface, at a radial distance relative to the inner skin of the extremities to be welded of at most 30 mm, the distribution means being of the tube/coil type provided with a plurality of exhaust openings or orifices or of the porous metallic sheet type (porous steel), permitting homogeneous diffusion of the inert gas in the direction of the mating surface.

In use of the device according to the invention, it must be ensured that the gas analyzed by the means for measuring the $O_2$ content is representative of the gas contained in the inerting chamber. For this purpose, the device comprises means such as an auxiliary pump, making it possible to create a controlled depression downstream of the means for measuring the $O_2$ content, which makes it possible to guarantee that a minimum flow rate of the gas contained in the inerting chamber, a predefined and programmable flow rate, passes through the said measuring means.

Likewise preferably provided is a system for exhausting the gas contained in the inerting chamber, this system having to be automatically controlled by the pressure and/or $O_2$ content measurement, so as to keep the pressure and/or $O_2$ content below the required alarm or safety thresholds, where this controlled and guided exhaust system may comprise a flap valve, or an electromagnetic valve or may be ensured by an increase in the flow rate of the auxiliary pump. The pressure or $O_2$ content within the inerting chamber can thus be quickly reestablished to return to ideal welding conditions.

The inert gas preferably is not diffused into the inerting chamber in continuous fashion until a predefined maximum pressure or $O_2$ content threshold is reached, but the inert gas flow rate is regulated in a first period to a predetermined maximum value and then is lowered in proportion with the drop in $O_2$ content measured in the chamber to a low value on the order of several liters/minute and until reaching the pressure and/or $O_2$ content level desired, in order to start a welding cycle.

According to a variant of the device according to the invention, the latter is equipped with means for verification of the calibration of the means for measuring the $O_2$ content, comprising an additional inert gas supply, the inert gas of this second supply being calibrated for oxygen for example at 5000 ppm, and preferably contained in a bottle outside the device and conducted to the latter by a pipe connected directly to the means for measuring the $O_2$ content, and means permitting switching from one supply to the other so that, when the inert gas calibrated for $O_2$ very briefly passes the measuring means, calibration of the measuring means can be verified.

A device according to the invention is usable in any position of the pipes to be welded, pipes horizontal for welding on land or in the sea with placement in shallow water, or vertical for welding in the sea in deep water.

The device according to the invention may likewise comprise a supporting strip on the back for maintaining the fusion bath at the time of the penetration phase, where this strip may be made of ceramic materials or of a metallic material such as copper or a copper alloy.

The invention likewise relates to a process for implementation of the device according to the invention, wherein once the said device, introduced into the interior of two pipes to be welded, has centered and clamped the said pipes, an inert gas is distributed at the mating surface between the latter so as to create a protective atmosphere behind the mating surface, characterized in that the $O_2$ content and/or the pressure prevailing there is measured in real time within the protective atmosphere, the said measurements made are compared relative to a predetermined $O_2$ content and/or pressure alarm threshold value, and then the flow rate and/or supply pressure of the inert gas to be sent is regulated in real time so as to maintain the $O_2$ content and/or the pressure below the predetermined alarm threshold.

Figure 2:
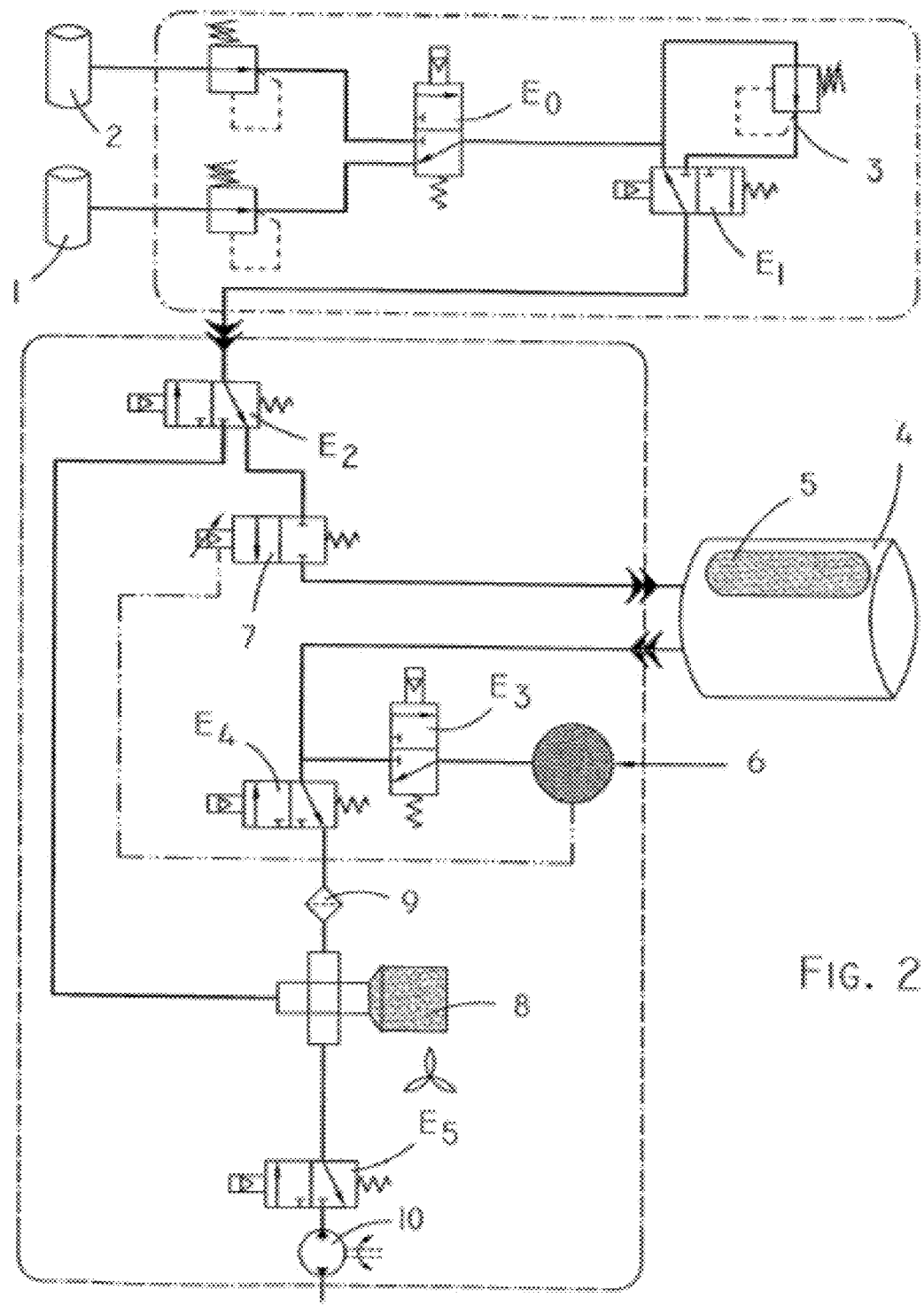

The invention will now be described in greater detail with reference to the drawing, wherein:

FIG. 1 is a diagram representing the variation in flow rate of the inerting gas and the $O_2$ content in the course of a welding cycle, and FIG. 2 represents the operation of the device according to the invention in schematic form.

As can be seen in FIG. 1, to the predetermined alarm threshold value below which the $O_2$ content should be, is added a start-of-cycle threshold value, so that the welding cycle only commences for an $O_2$ content below this start-of-cycle threshold value.

Thus, during the interval of time A preceding the start of the welding cycle, the inert gas, such as argon, is distributed at the mating surface so as to quickly lower the $O_2$ content to below the start-of-cycle threshold value by adjusting the argon flow rate.

In this way, it is ensured that welding commences when the mating surface is indeed in a protective atmosphere sufficient to guarantee optimal welding conditions.

Welding is then started. During the interval of time B, the argon flow rate is kept constant and the $O_2$ content at a given moment exceeds the alarm threshold. The means for regulating the flow rate of argon then are commanded in real time to reestablish the $O_2$ content below this alarm threshold value by increasing the said flow rate, during the interval C.

A safety threshold value, greater than the alarm threshold value and which, if it is exceeded, produces total arrest of the welding cycle until the reestablishment of ideal welding conditions, may be provided.

As can be seen schematically in FIG. 2, the device comprises means for distribution of an inert gas comprising an inert gas supply 1 as well as a standard gas supply 2. A first electromagnetic valve E0 makes it possible to select one or the other of the supplies. In FIG. 2, the distribution of inert gas has been selected so as to create a protective atmosphere at the mating surface.

Then pressure-regulating means 3 are provided. In the diagram represented, a second electromagnetic valve E1 guides the inert gas directly to a third electromagnetic valve E2, which sends the gas to the inerting chamber 4 created at the mating surface. A temperature pick-up 5 is provided in this chamber 4.

The gas is likewise guided to a pressure pick-up 6, permitting measurement of the pressure prevailing in the said chamber 4, the pick-up 6 being associated with a pressure regulator 7 positioned downstream of the electromagnetic valve E2. Hence, a detected pressure measurement greater than the alarm threshold value commands the pressure regulation 7. The electromagnetic valve E3 allows the pressure pick-up 6 to be used or not used.

By means of an electromagnetic valve E4, the gas is guided to a cell 8 for measurement of the $O_2$ content. A filter 9 may be positioned before the cell 8. When the cell 8 detects an $O_2$ content greater than the predetermined alarm threshold, the pressure regulator (which ?) is commanded in return.

The cell 8 is likewise connected to an auxiliary pump 9 by way of an electromagnetic valve E5.

This auxiliary pump 9 [sic] makes it possible to verify that the gas analyzed by the cell 8 is indeed representative of the gas contained in the chamber 4, the pump 9 [sic] allowing creation of a controlled depression downstream of the cell 8, in order to guarantee a minimum flow rate.

The invention of course is not limited to the given embodiment described above but, on the contrary, covers all variants thereof, in particular as concerns selection of alarm threshold values which are determined as a function of welding conditions and of the environment in which welding takes place.

The invention claimed is:

1. Centering and clamping device for pipes placed end to end to be welded and to form a pipeline, the device being adapted to center and clamp two pipes to be welded, the device comprising:
   at least one seal adapted to provide a leak-tight partition which defines an inert chamber at a mating surface of the pipes;
   electromagnetic valves configured to distribute an inert gas in order to create a protective atmosphere at the mating surface in order to prevent oxidation during the welding;
   an $O_2$ pick-up configured to perform real-time measurements of an $O_2$ content of the protective atmosphere, and a pressure pick-up configured to perform measurements of the pressure of the protective atmosphere; and
   regulators connected to the electromagnetic valves configured to regulate, in real time during the welding of the ends of pipes, a flow rate of inert gas and of a supply pressure of the inert gas as a function of the $O_2$ content measured in the protective atmosphere and the pressure measured within said atmosphere, so as to maintain the $O_2$ content of the protective atmosphere below a first predetermined alarm threshold value and the pressure of the atmosphere below a second predetermined alarm threshold value.

2. Device according to claim 1, wherein the $O_2$ pick-up cooperates with a command and control unit such as to compare, in real-time, the real-time measurements of the $O_2$ content to the first predetermined alarm threshold value, the command and control unit being adapted to send instructions to the regulators, such that in response to the instructions, the regulators regulate the flow rate and/or the supply pressure of the inert gas thereby allowing the $O_2$ content to be maintained below the first predetermined alarm threshold.

3. Device according to claim 1 wherein the first predetermined alarm threshold value is an $O_2$ content of 5000 ppm.

4. Device according to claim 1, wherein the pressure pick-up cooperates with a command and control unit such as to compare the measurements of the pressure to a second predetermined alarm threshold value, the command and control unit being adapted to send instructions to the command and control unit, such that in response to the instructions, the regulators regulate the flow rate and/or supply pressure of the inert gas, so as to maintain the pressure of the said atmosphere below the second predetermined alarm threshold value.

5. Device according to claim 1, wherein the second predetermined alarm threshold value is a pressure of 12 millibars.

6. Device according to claim 1, further comprising welding commands activated when the $O_2$ content and/or the pressure are lower than a first and/or second predetermined start-of-cycle threshold values which are lower than the first and/or second predetermined threshold value.

7. Device according to claim 2, further comprising a connection for transmission of an error message to the command and control unit (of the outside welding station) when the $O_2$ content and/or the pressure are greater than the first and/or second predetermined alarm threshold values and when a duration of exceedance of the alarm threshold is below a predetermined time.

8. Device according to claim 7, wherein the command and control unit is adapted for automatically stopping the welding, wherein the stopping is activated if the duration of exceedance of the first alarm threshold value exceeds the predetermined time.

9. Device according to claim 2, wherein the command and control unit is adapted for automatically stopping the welding, wherein the stopping is activated when the $O_2$ content and/or the pressure are greater than a first and/or a second predetermined safety threshold values, respectively, which are greater than predetermined alarm threshold values, respectively.

10. Device according to claim 1, wherein a temperature pick-up is provided in the inert chamber.

11. Device according to claim 1, wherein the electromagnetic valves for distribution of the for distribution of the inert gas are located on the device in a tube/coil in such a way that the distribution takes place directly behind the mating surface, at a radial distance relative to the inner skin of the extremities to be welded of at most 30 mm, the tube/coil are provided with a plurality of exhaust openings or orifices, allowing the inert gas to be diffused homogeneously in the direction of the mating surface.

12. Device according to claim 1, further comprising an auxiliary pump for creating a controlled depression downstream of the means for measurement of the $O_2$ pick-up, thereby allowing a minimum flow rate of gas contained in the inert chamber to pass through the $O_2$ pick-up, wherein the minimum flow rate is a predefined and programmable flow rate.

13. Device according to claim 1, equipped with an additional inert gas supply for verification of the calibration of the $O_2$ pick-up, the inert gas of the second supply being calibrated for oxygen at 5000 ppm and preferably contained in a bottle outside the device and conducted to the latter by a pipe connected directly to the $O_2$ pick-up, and the device further comprises a switch for switching from one gas supply to the other so that, when the inert gas calibrated at 5000 ppm $O_2$ very briefly passes the $O_2$ pick-up, calibration of the $O_2$ pick-up can be verified.

14. Device according to claim 1, further comprising a system for exhaust of the gas contained in the inert chamber, the system being automatically controlled by the measurements of the pressure and/or the $O_2$ content, so as to keep the pressure and/or the $O_2$ content lower than the required thresholds, and wherein the controlled and guided exhaust system comprises a flap valve or an electromagnetic valve.

15. A process for centering, clamping and welding pipes placed end to end to form a pipeline, comprising:
   introducing a centering and clamping device into an interior of two pipes to be welded;
   centering and clamping the two pipes;
   distributing an inert gas at a mating surface between the two pipes so as to create a protective atmosphere behind the mating surface;

welding ends of the two pipes together;

measuring in real-time, during the welding the ends of two pipes, $O_2$ content and pressure within the protective atmosphere;

comparing measured $O_2$ content and pressure values relative to first and second predetermined alarm threshold values of $O_2$ content and pressure values; and regulating in real time a flow rate and a supply pressure of the inert gas to be sent to the inert chamber during the welding of said two pipes so as to maintain the $O_2$ content and the pressure values below the first and second predetermined alarm threshold values.

16. The device of claim 1, wherein the regulators simultaneously regulate pressure and $O_2$ content in the protective atmosphere during the welding.

17. The process of claim 15, further comprising simultaneously regulating pressure and $O_2$ content in the protective atmosphere during the welding.

* * * * *